US 8,875,622 B2

(12) United States Patent
Chung

(10) Patent No.: US 8,875,622 B2
(45) Date of Patent: Nov. 4, 2014

(54) HEAT TRANSFER ELEMENT FOR BARBECUE GRILL

(76) Inventor: Kiosky Chung, Taichung (TW)

( * ) Notice: Subject to any disclaimer, the term of this patent is extended or adjusted under 35 U.S.C. 154(b) by 273 days.

(21) Appl. No.: 13/481,776

(22) Filed: May 25, 2012

(65) Prior Publication Data

US 2013/0312622 A1    Nov. 28, 2013

(51) Int. Cl.
  *A47J 37/07*    (2006.01)
  *A47J 37/06*    (2006.01)
(52) U.S. Cl.
  USPC ............................................. 99/447; 99/401
(58) Field of Classification Search
  CPC ...... A47J 37/0713; A47J 37/0786; F28F 7/00
  USPC ............ 99/444, 447, 482; 126/168, 179, 506; 165/185
  See application file for complete search history.

(56) References Cited

U.S. PATENT DOCUMENTS

| | | | |
|---|---|---|---|
| 6,176,173 B1* | 1/2001 | Holbrook et al. | 99/401 |
| 2004/0025862 A1* | 2/2004 | Lor et al. | 126/41 R |
| 2005/0098168 A1* | 5/2005 | Williams et al. | 126/25 R |
| 2005/0263009 A1* | 12/2005 | Woodland et al. | 99/388 |
| 2005/0284461 A1* | 12/2005 | Hsu | 126/41 R |
| 2006/0112949 A1* | 6/2006 | Ducate et al. | 126/25 R |
| 2009/0255414 A1* | 10/2009 | Wang | 99/446 |
| 2012/0138046 A1* | 6/2012 | Kyte | 126/39 B |
| 2013/0192476 A1* | 8/2013 | Broerman | 99/482 |
| 2013/0298894 A1* | 11/2013 | Kleinsasser | 126/25 R |

* cited by examiner

*Primary Examiner* — Dana Ross
*Assistant Examiner* — Lindsey C Teaters

(57) ABSTRACT

A heat transfer element includes two wings extending from a ridge. The ridge includes a first end and a second end. Each of the wings includes an edge. The first end of the ridge is placed at a higher elevation than the second end of the ridge when a plane defined by edges of the wings is placed horizontally.

6 Claims, 11 Drawing Sheets

HEAT TRANSFER ELEMENT FOR BARBECUE GRILL

BACKGROUND OF INVENTION

1. Field of Invention

The present invention relates to a barbecue grill and, more particularly, to a heat transfer element for a barbecue grill.

2. Related Prior Art

As disclosed in U.S. Pat. No. 6,337,466, a toaster oven includes an interior liner 26, four heating elements 28 and a diffuser 20. The diffuser 20 includes two legs 40 and 42 extending from an apex 44, a group of holes 52 defined therein near an end 48, and another group of holes 52 defined therein near another lateral side 50. The heating elements 28 are Calrod® tubular heaters extending transversely in a space defined by the interior liner 26. The first and second heating elements 28 are placed at a same elevation in an upper portion of the space defined by the interior liner 26. The third heating element 28 is placed above the fourth heating element 28 in a lower portion of the space defined by the interior liner 26. The diffuser 20 is placed above the third heating element 28. The apex 44 is placed horizontally. The heating elements 28 provide heat in operation. By radiation, a first portion of the heat provided by the third and fourth heating elements 28 is transferred to the diffuser 20. By convection, a second portion of the heat is transferred to the diffuser 20 via air. By convention, the first and second portions of the heat are diffused over the diffuser 20. Then, the first and second portions of the heat are transferred into the space defined by the interior liner 26 from the diffuser 20. However, each of the heating elements 28 provides more heat in the middle than at the ends. Hence, the holes 52 facilitate the flow of hot air, thus evenly distributing the heat to an elongated region above the third and fourth heating elements 28.

Similar diffusers are used in barbecue grills as disclosed in U.S. Pat. Nos. 5,368,009, 5,775,154 and 8,113,191. For example, as disclosed in U.S. Pat. No. 5,368,009, a barbecue grill includes a boiler chamber 100, three burners 105, 105A and 105B, three diffusers 109, 108 and 107 and two baffles 111 and 110. Each of the diffusers 109, 108 and 107 and baffles 111 and 110 is formed with an apex. The burners 105, 105A and 105B are placed longitudinally in the boiler chamber 100. Each of the burners 105, 105A and 105B includes upward-pointing orifices defined therein. Gas vents from the orifices and gets burned to provide heat. The diffuser 109 is placed above the burner 105 so that the former transversely diffuses the heat provided by the latter. The diffuser 108 is placed above the burners 105a so that the former transversely diffuses the heat provided by the latter. The diffuser 107 is placed above the burner 105B so that the former transversely diffuses the heat provided by the latter. The baffle 111 is placed above a gap defined between the diffusers 109 and 108 so that the former transversely diffuses the heat that goes through the latter. The baffle 110 is placed above a gap defined between the diffusers 108 and 107 so that the former transversely diffuses the heat that goes through the latter. The apexes of the diffusers 109, 108 and 107 and baffles 111 and 110 extend horizontally.

The present invention is therefore intended to obviate or at least alleviate the problems encountered in prior art.

SUMMARY OF INVENTION

It is the primary objective of the present invention to provide a barbecue grill with a heat transfer element for facilitating the transfer of heat toward a front plate of the barbecue grill.

To achieve the foregoing objectives, the heat transfer element includes two wings extending from a ridge. The ridge includes a first end and a second end. Each of the wings includes an edge. The first end of the ridge is placed at a higher elevation than the second end of the ridge when a plane defined by edges of the wings is placed horizontally.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
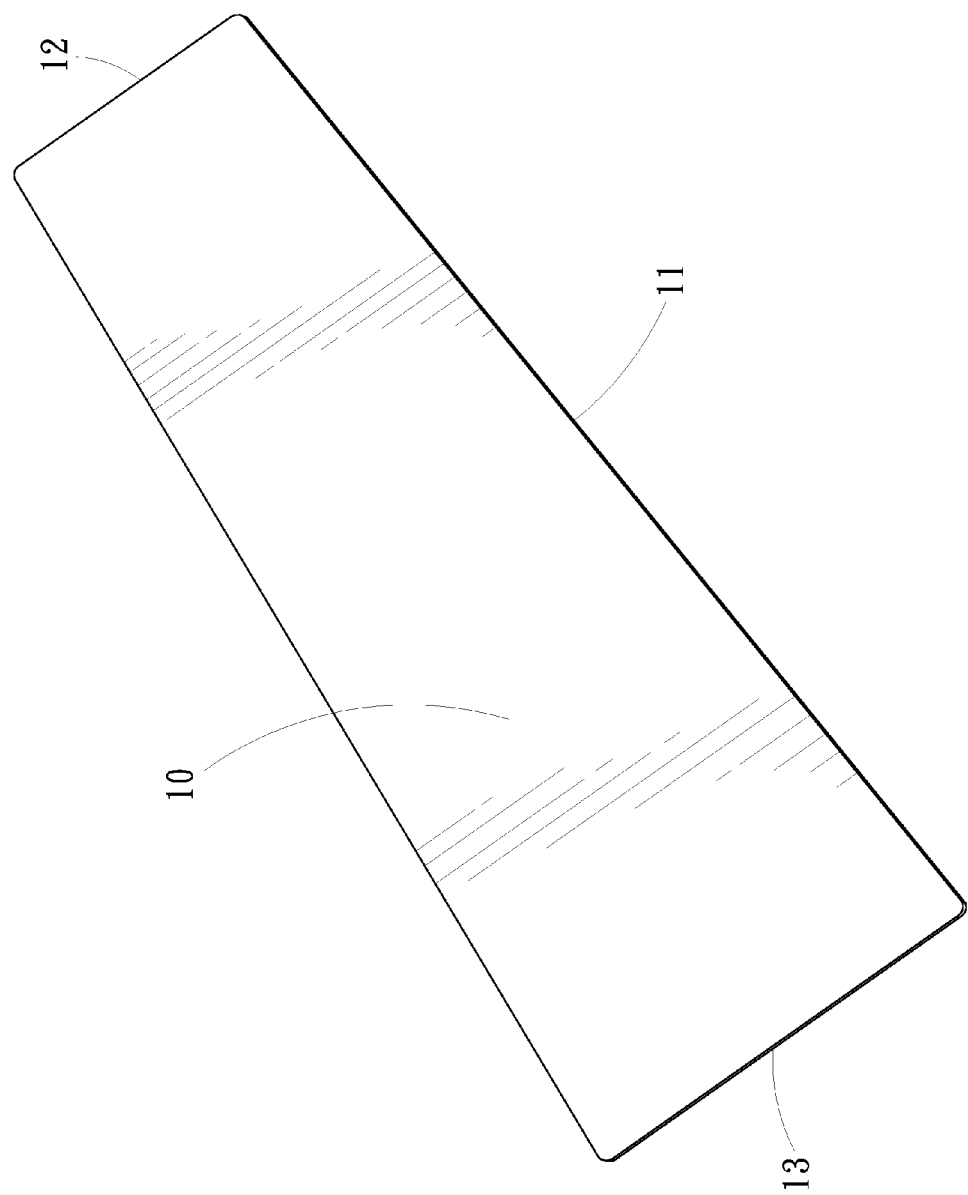
FIG. 1 is a perspective view of a metal sheet for a heat transfer element according to the first embodiment of the present invention.

Referring to FIG. 1, there is shown a metal sheet 10 for a heat transfer element according to a first embodiment of the present invention. The metal sheet 10 is a trapezoidal element that includes two inclined edges 11 extending between two parallel edges 12 and 13. The edge 12 is shorter than the edge 13.

Figure 2:
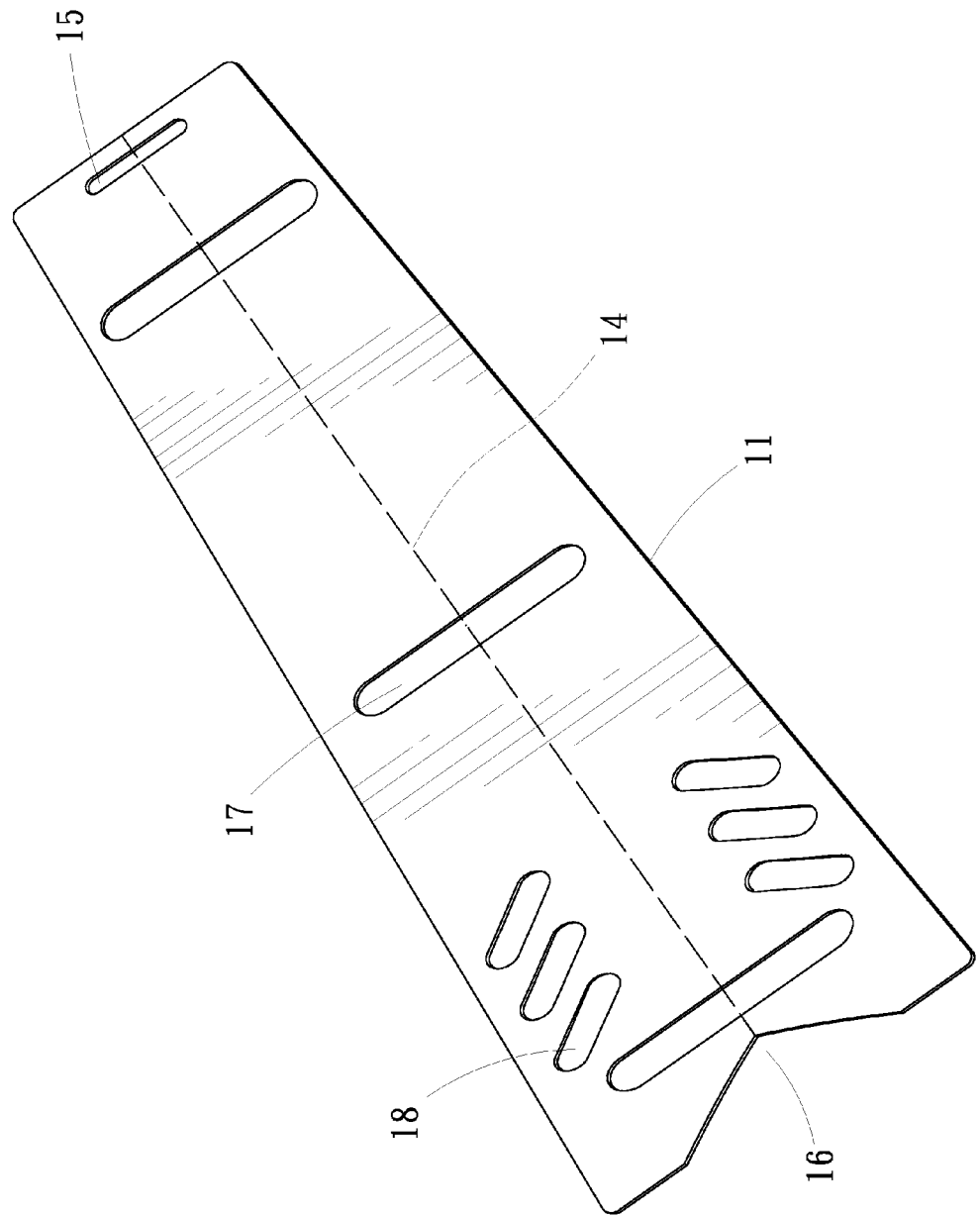
FIG. 2 is a top view of the metal sheet shown in FIG. 1.

Referring to FIG. 2, the metal sheet 10 is punched to define a slot 15 near the edge 12. Furthermore, the metal sheet 10 is cut to define a V-shaped cutout 16 in the edge 13. Moreover, the metal sheet 10 is pressed to form three reinforcement ribs 17 on the top. In addition, the metal sheet 10 is punched to define two groups of vents 18 respectively in two halves divided by a centerline 14. The vents 18 may be slots as shown or apertures in any other proper shape.

Figure 3:
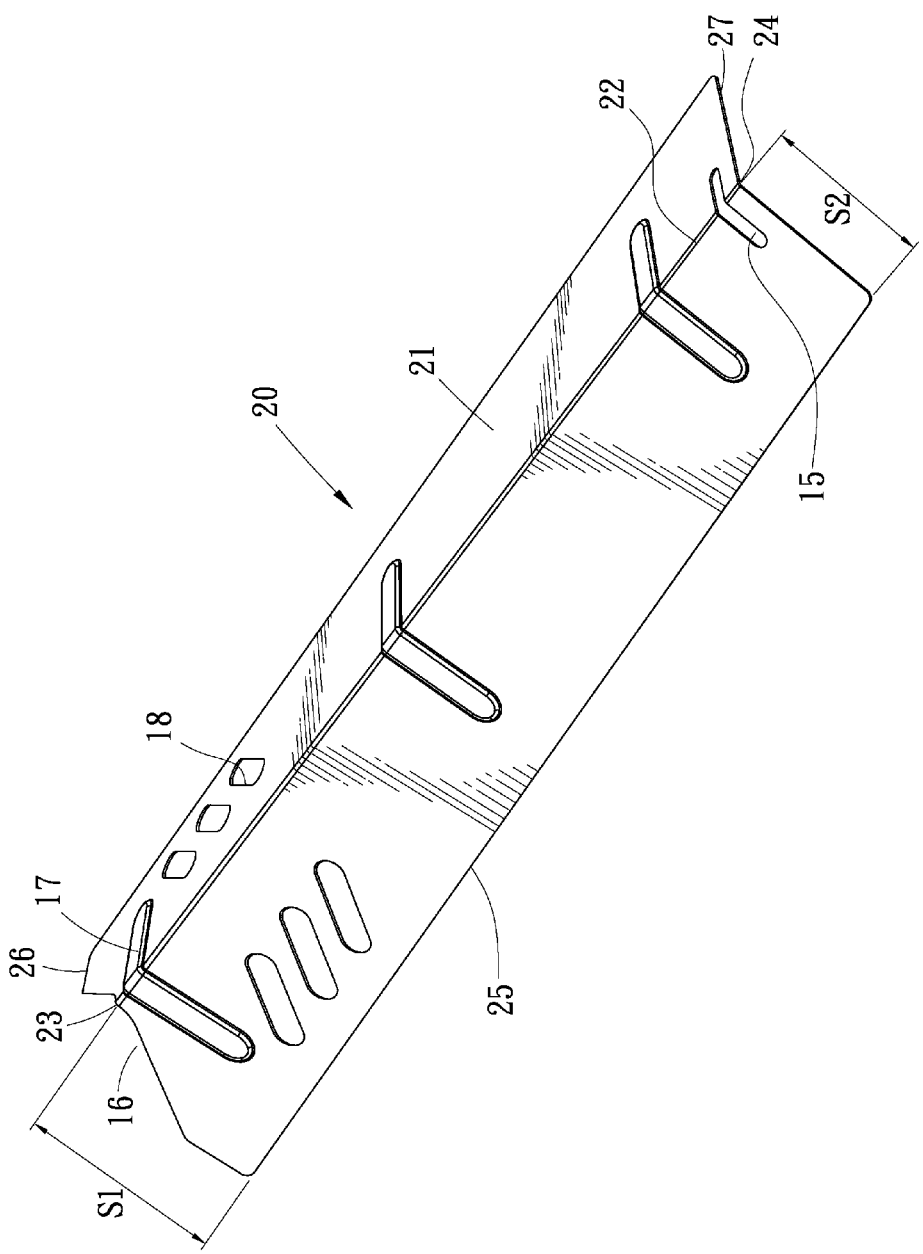
FIG. 3 is a perspective view of a heat transfer element according to the first embodiment of the present invention.

Referring to FIG. 3, to form a heat transfer element 20 according to the preferred embodiment of the present invention, the metal sheet 10 is folded along the center line 14, with the edges 11 extending parallel to each other. The heat transfer element 20 includes two ends 26 and 27 corresponding to the edges 13 and 12, respectively. Furthermore, the heat transfer element 20 includes two wings 21 and a ridge 22. The wings 21 extend from the ridge 22. The ridge 22 extends along the centerline 14. The ridge 22 includes two ends 23 and 24 near the edges 13 and 12.

The first reinforcement rib 17 is placed near the end 23. The second reinforcement rib 17 is placed between the first reinforcement rib 17 and the third reinforcement rib 17, which is placed near the end 24. The groups of vents 18 are placed between the first and second reinforcement ribs 17.

Figure 4:
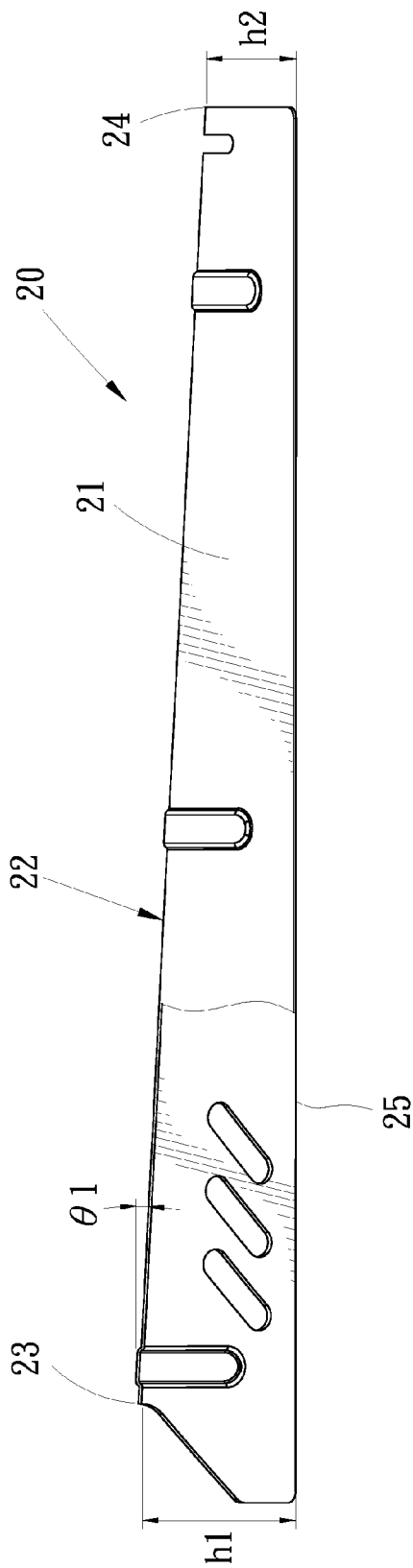
FIG. 4 is a side view of the heat transfer element shown in FIG. 3.

Referring to FIG. 4, a plane 25 is defined by the edges 11. A height h1 measured from the end 23 to the plane 25 is larger than a height h2 measured from the end 24 to the plane 25. That is, the ridge 22 is inclined relative to the plane 25. Hence, an angle θ1 is defined between the ridge 22 and a line that extends parallel to the plane 25 and passes the end 23.

Figure 5:
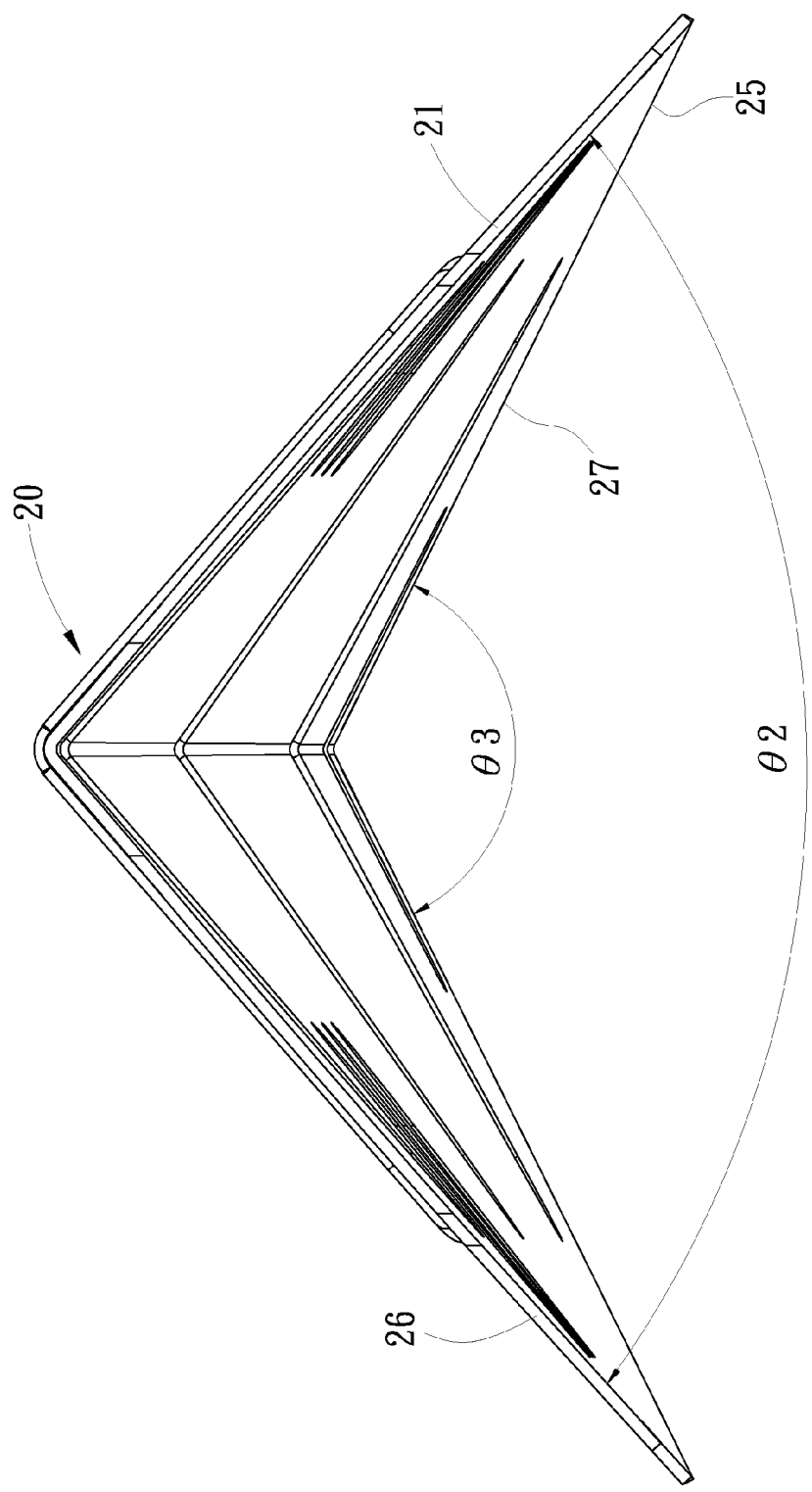
FIG. 5 is a front view of the heat transfer element shown in FIG. 3.
Figure 6:
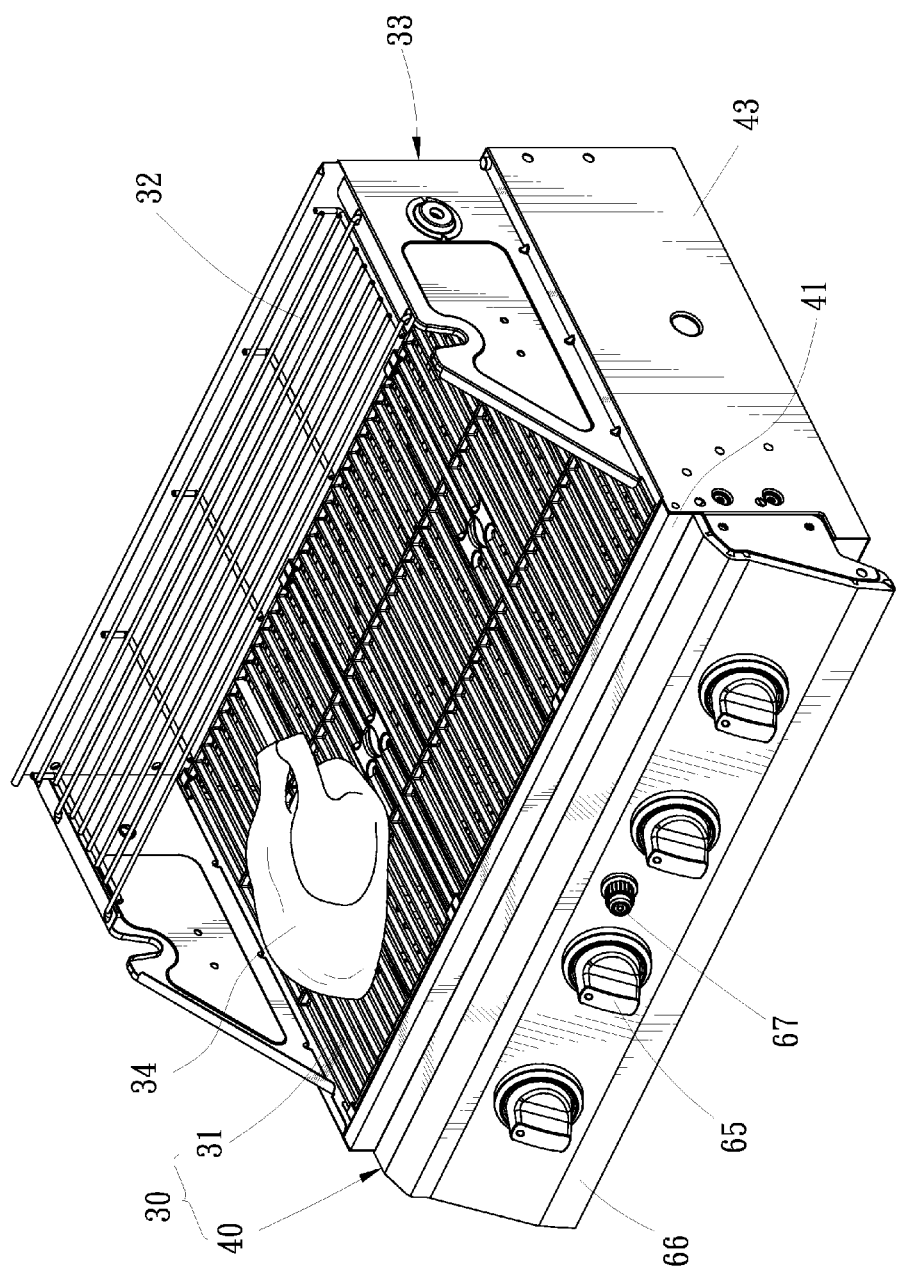
FIG. 6 is a perspective view of a barbecue grill equipped with several heat transfer elements like the one shown in FIG. 3.
Figure 7:
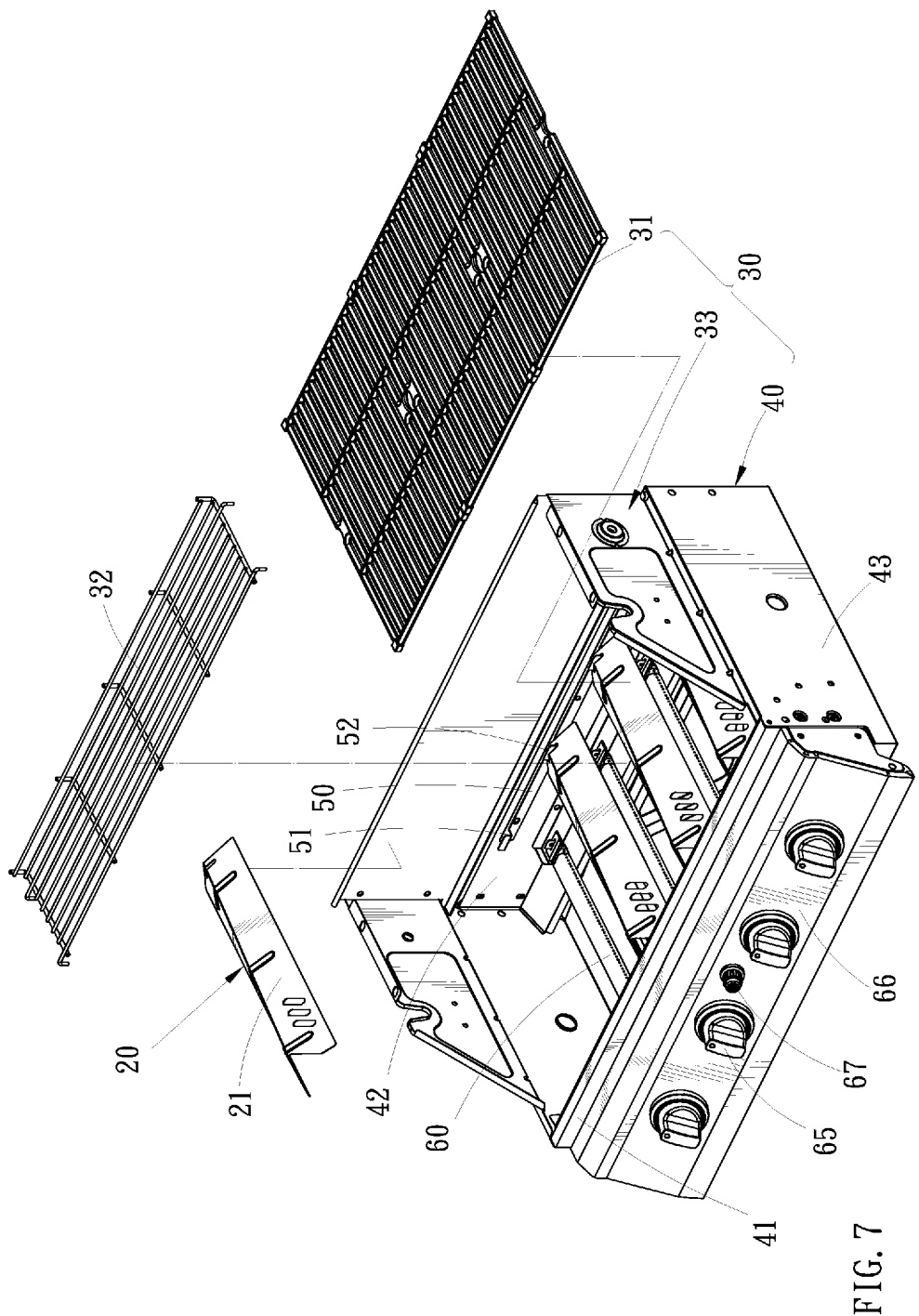
FIG. 7 is an exploded view of the barbecue grill shown in FIG. 6.
Figure 8:
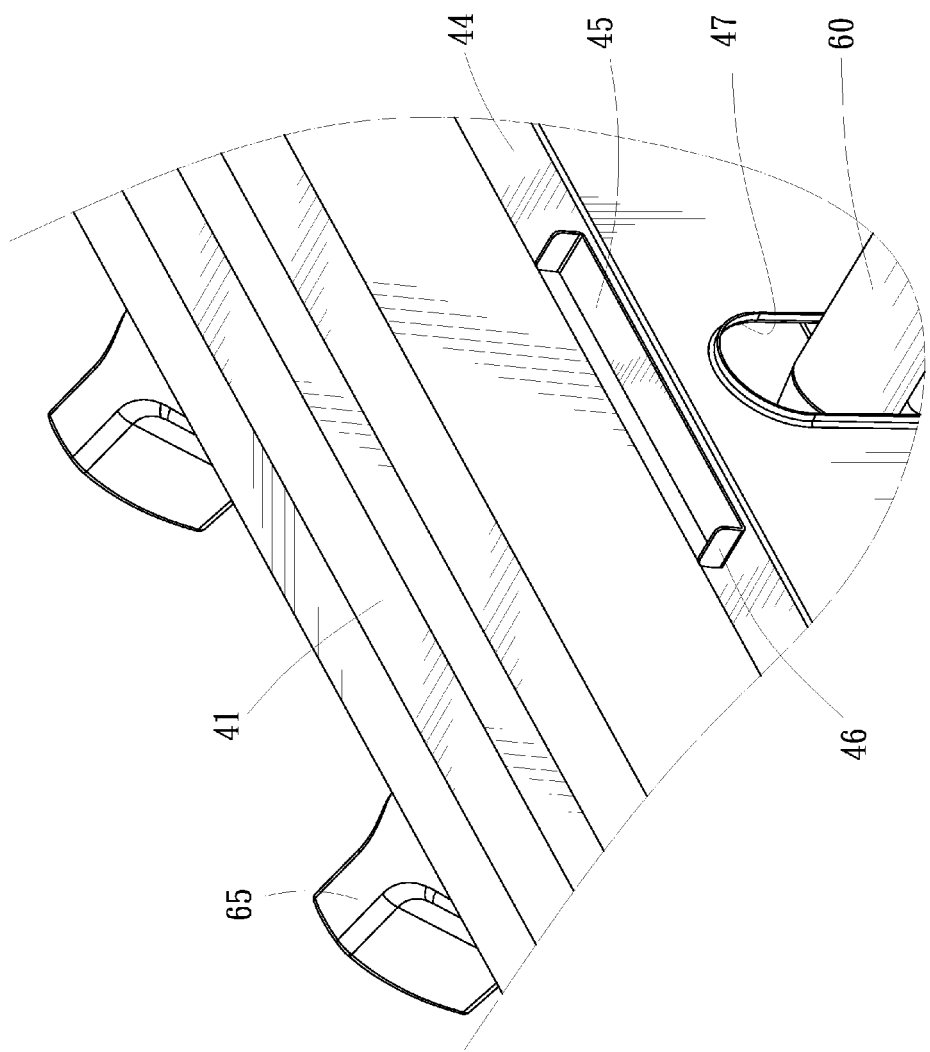
FIG. 8 is an enlarged partial view of the barbecue grill shown in FIG. 6

Referring to FIG. 5, an angle θ2 is defined by the heat transfer element 20 at the end 26 while another angle θ3 is defined by the heat transfer element 20 at the end 27. The edges 11 extend parallel to each other as mentioned above. That is, the distance between the edges 11 is constant throughout their entire lengths. In addition, the edge 12 is shorter than the edge 13, i.e., a half length S1 of the edge 13 is longer than half length S2 of the edge 12. Hence, the angle θ2 is smaller than the angle θ3.

Referring to FIGS. 6 through 9, there is a shown a barbecue grill 30. The barbecue grill 30 includes a body 40, a food-supporting unit, a burning unit and a heat-conducting unit. The body 40 is a hollow element that includes a front plate 41, a rear plate 42 and two lateral plates 43. The lateral plates 43 extend between the front plate 41 and the rear plate 42.

The food-supporting unit includes two grids 31 and 32 and a windshield 33. The first grid 31 is placed on the body 40. The second grid 32 is placed on the windshield 33 that is attached to the rear plate 42 and the lateral plates 43. Thus, the first grid 31 is placed at a lower elevation than the second grid 32. The first grid 31 is larger than the second grid 32. Hence, the first grid 31 includes a front portion not covered by the second grid 32 and a rear portion under the second grid 32. In use, raw food is grilled on the first grid 31 and cooked food can be kept warm on the second grid 32.

The burning unit includes four burners 60, four pipes 64, four knobs 65, a control panel 66, a switch 67 and four igniters 68. The control panel 66 is attached to the front plate 41, leaving a gap between them. The knobs 65 and the switch 67 are placed on the control panel 66. The switch 67 is electrically connected to the igniters 68. Each igniter 68 is placed near a respective burner 60.

The burners 60 are placed in the body 40. Each burner 60 includes a closed end 61 placed near the rear plate 42 and an open end 62 inserted in the gap between the front plate 41 and the control panel 66 via an oval opening 47 defined in the front plate 41. The open end 62 of each burner 60 is in communication with a respective fuel pipe 64 via a valve (not shown) that is under control of a respective knob 65. Each burner 60 further includes two rows of orifices 63, with each row placed on a lateral side thereof. That is, the orifices 63 are directed horizontally, not vertically.

The heat-conducting unit includes four heat transfer elements 20, four holders 45 and a rack 50. Each holder 45 includes two vertical ends 46 extending from a horizontal middle portion. The horizontal middle portion of each holder 45 is attached to a horizontal flange that extends from the front plate 41, which extends substantially vertically.

The rack 50 includes a vertical portion, a horizontal portion 51 extending from the vertical portion, and four vertical tabs 52 extending from the horizontal portion 51. The vertical portion of the rack 50 is attached to the rear plate 42.

Each heat transfer element 20 is placed above a respective burner 60. Each heat transfer element 20 includes an end held between and by the vertical ends 46 of a respective holder 45 and another end placed on the horizontal portion of the rack 50. Each vertical tab 52 is inserted in the slot 15 of a respective heat transfer element 20. Thus, each heat transfer element 20 is held firmly above a respective burner 60.

Figure 10:
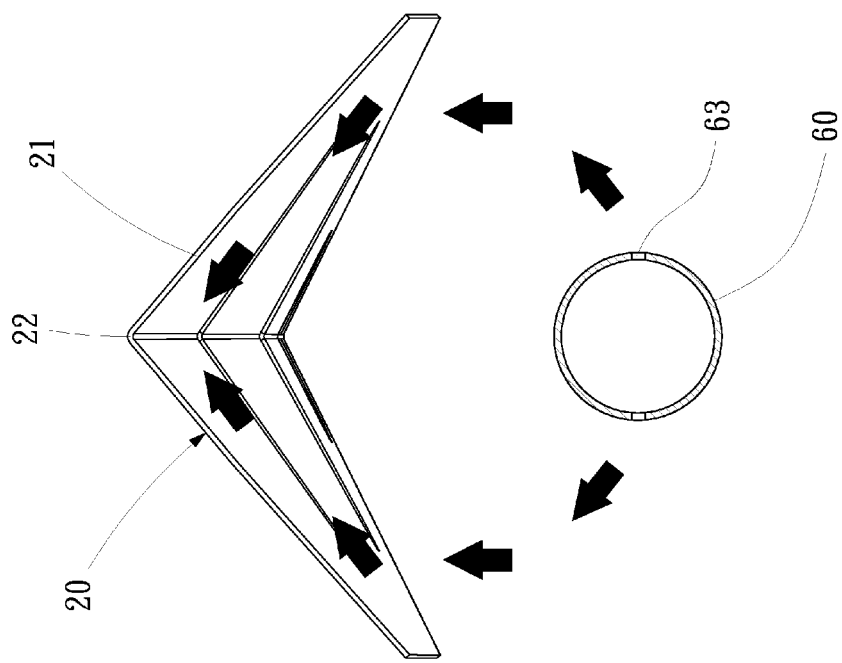
FIG. 10 is a front view of the heat transfer element shown in FIG. 3 in operation.

Referring to FIG. 10, each burner 60 provides flames from the groups of orifices 63. The flames come out of the orifices 63 horizontally and then turn slightly vertically. The flames provide heat that is then transferred through radiation and convection. In the convention, air is used as the medium.

Although not indicated by any arrow, it should be understood that each heat transfer element 20 receives a portion of the heat, transfers this portion of the heat over itself by conduction, and transfers this portion of the heat upward by radiation and convection. In the convection, air above the heat transfer element 20 is used as the medium.

Figure 9:
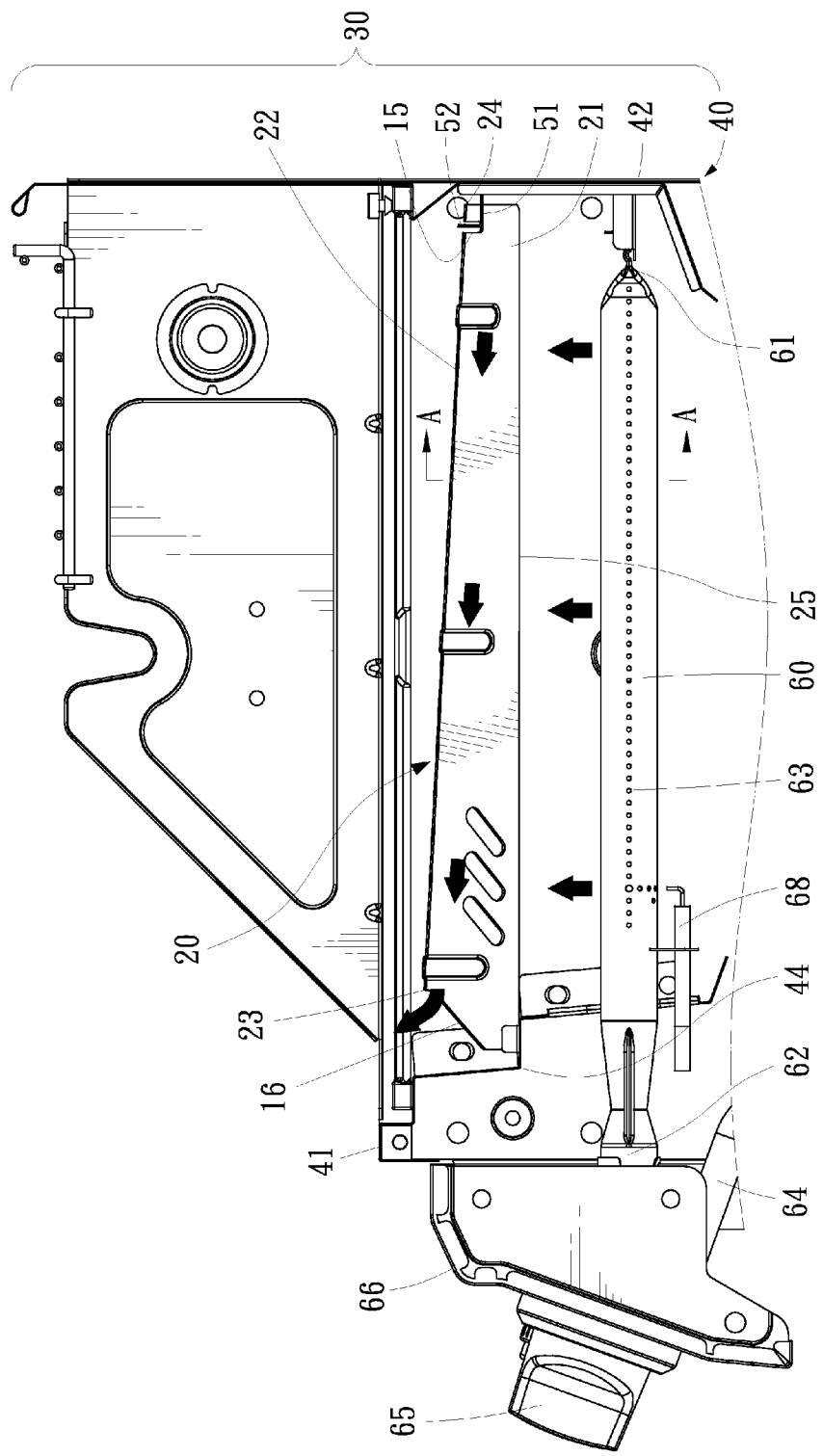
FIG. 9 is a cross-sectional view of the barbecue grill shown in FIG. 6.

As shown in FIG. 10, each heat transfer element 20 directs air under it toward the ridge 22 from the edges 11 as indicated by arrow heads. As shown in FIG. 9, each heat transfer element 20 guides the air under it toward the front portion of the first grid 31 from the rear portion of the first grid 31. Hence, each heat transfer element 20 transfers another portion of the heat toward the front portion of the first grid 31 from the rear portion of the first grid 31 according to convection in which the air under it is used as the medium.

There are two reasons for directing the air under each heat transfer element 20 to the front portion of the first grid 31 from the rear portion of the first grid 31. At first, a front portion of each heat transfer element 20 does not include any orifice in order not to overheat the fuel pipes 64, the knobs 65, the control panel 66 and the switch 67. Secondly, raw food is often grilled on the front portion of the first grid 31 while cooked food is kept warm on the second grid 32 that is placed above the rear portion of the first grid 31.

It is desirable to transfer some of the heat toward the front portion of the first grid 31 but keep it away from the fuel pipes 64, the knobs 65, the control panel 66, and the switch 67. Each heat transfer element 20 directs the air under itself toward the front portion of the first grid 31 while the cutout 16 and the vents 18 allow the air to go toward the front portion of the first grid 31 but away from the fuel pipes 64, the knobs 65, the control panel 66 and the switch 67.

Figure 11:
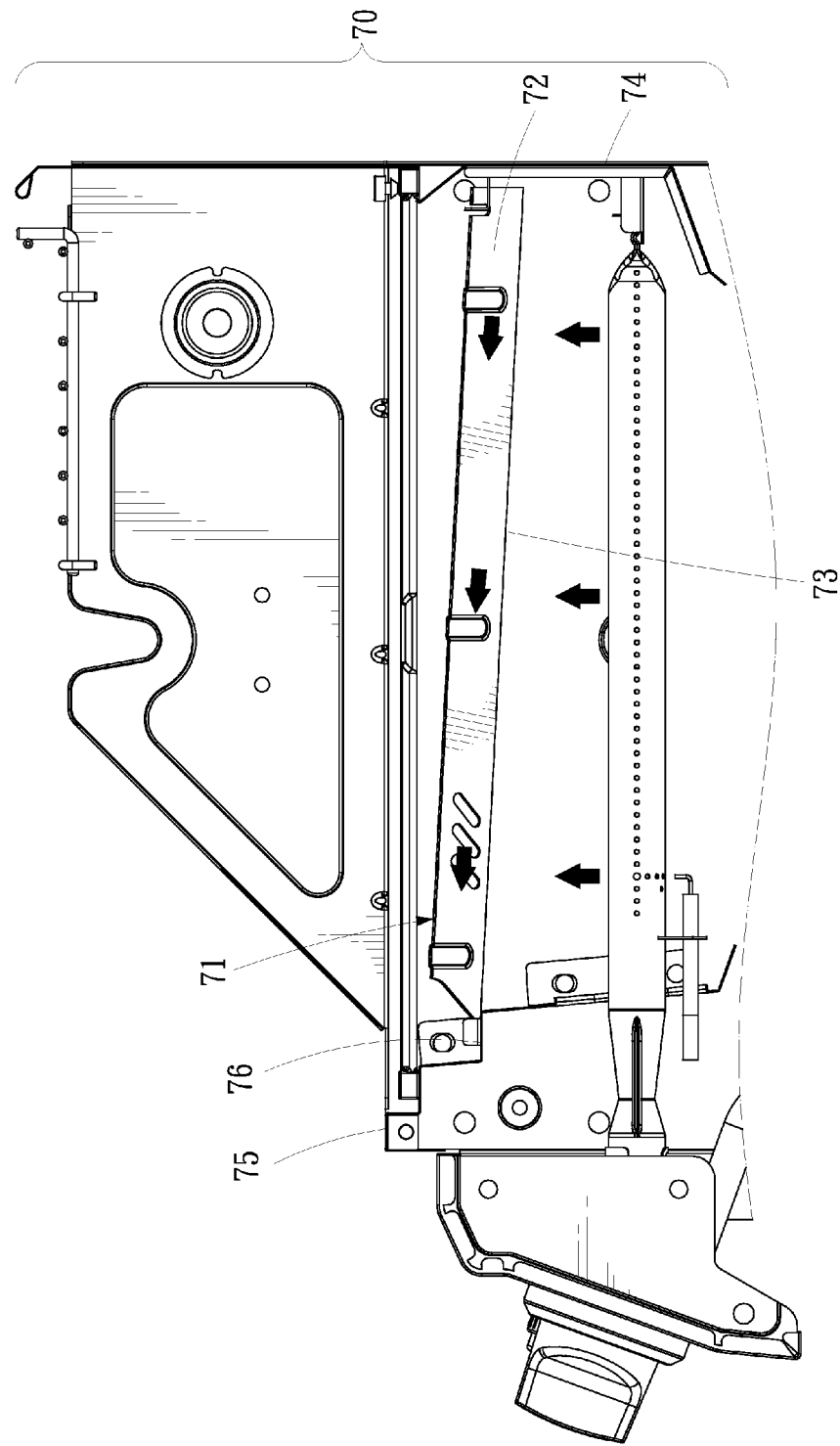
FIG. 11 is a cross-sectional view of a barbecue grill equipped with several heat transfer elements according to the second embodiment of the present invention.

Referring to FIG. 11, shown is a barbecue grill 70 equipped with heat transfer elements 71 according to a second embodiment of the present invention. Each heat transfer element 71 is made by folding a rectangular metal sheet. Hence, each heat transfer element 71 includes two wings 72 extending from a ridge like the ridge 22. Each wing 72 includes a constant width throughout its length. The width is measured from an edge 73 to the ridge of each heat transfer element 70. The barbecue grill 70 includes a body formed with a rear plate 74 and a front plate 75. The front plate 75 includes a horizontal portion 76 that is placed at a higher elevation than the rack 50. Thus, each heat transfer element 71 extends upward as it extends toward the front plate 75.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A barbecue grill including:
   a body including a rear plate and a front plate formed with a horizontal portion;
   a rack attached to the rear plate at a lower elevation than the horizontal portion of the front plate;
   at least one burner placed in the body and formed with two rows of orifices in lateral portions; and at least one heat transfer element placed above the burner and supported on the horizontal portion of the front plate at an end and supported on the rack at another end, wherein the heat transfer element includes:

a ridge including a first end and a second end; and two wings extending from the ridge and each including an edge, wherein the first end of the ridge is placed at a higher elevation than the second end of the ridge as the heat transfer element is supported on the horizontal portion of the front plate and the rack, wherein the first end of the ridge is placed at a higher elevation than the second end of the ridge as a plane defined by edges of the wings is placed horizontally.

2. The barbecue grill according to claim 1, wherein each of the wings includes a width that gets larger in a direction toward the first end of the ridge from the second end of the ridge.

3. The barbecue grill according to claim 2, further including a cutout at the first end of the ridge.

4. The barbecue grill according to claim 2, further including vents near the first end of the ridge.

5. The barbecue grill according to claim 4, wherein each of the wings includes vents near the first end of the ridge.

6. The barbecue grill according to claim 2, further including reinforcement ribs formed thereon.

* * * * *